United States Patent
Goldstein et al.

(10) Patent No.: US 8,606,801 B2
(45) Date of Patent: Dec. 10, 2013

(54) CALENDAR-BASED SUGGESTION OF A TRAVEL OPTION

(75) Inventors: Adam Julian Goldstein, San Francisco, CA (US); Steven Ladd Huffman, San Francisco, CA (US)

(73) Assignee: Hipmunk, Inc., San Francisco, CA (US)

( * ) Notice: Subject to any disclaimer, the term of this patent is extended or adjusted under 35 U.S.C. 154(b) by 55 days.

(21) Appl. No.: 13/210,562

(22) Filed: Aug. 16, 2011

(65) Prior Publication Data
US 2013/0046788 A1   Feb. 21, 2013

(51) Int. Cl.
*G06F 17/30* (2006.01)
(52) U.S. Cl.
USPC .......................................... 707/758; 707/780
(58) Field of Classification Search
USPC ............ 707/999.003–999.005, 713, 758, 780
See application file for complete search history.

(56) References Cited

U.S. PATENT DOCUMENTS

| | | | |
|---|---|---|---|
| 6,307,572 B1 | 10/2001 | DeMarcken et al. | |
| 6,609,098 B1 | 8/2003 | DeMarcken | |
| 7,149,983 B1 | 12/2006 | Robertson et al. | |
| 7,174,536 B1 | 2/2007 | Kothari et al. | |
| 7,360,157 B1 | 4/2008 | Yalovsky | |
| 7,822,816 B2 | 10/2010 | Payne | |
| 2005/0015316 A1* | 1/2005 | Salluzzo ........................ | 705/30 |
| 2006/0106655 A1 | 5/2006 | Lettovsky et al. | |
| 2007/0198306 A1 | 8/2007 | Crean et al. | |
| 2008/0126989 A1 | 5/2008 | Flores et al. | |
| 2008/0208643 A1* | 8/2008 | Guastalla et al. ................ | 705/6 |
| 2009/0276733 A1 | 11/2009 | Manyam et al. | |
| 2009/0313055 A1* | 12/2009 | Martin et al. ..................... | 705/6 |
| 2010/0005394 A1* | 1/2010 | Dubnov ......................... | 715/733 |
| 2010/0042592 A1* | 2/2010 | Stolz et al. ........................ | 707/3 |
| 2010/0094529 A1* | 4/2010 | Gupta et al. .................. | 701/117 |
| 2010/0332282 A1* | 12/2010 | Bradley et al. ..................... | 705/9 |
| 2011/0022428 A1* | 1/2011 | Parker ................................ | 705/6 |
| 2011/0090078 A1* | 4/2011 | Kim et al. ..................... | 340/522 |

FOREIGN PATENT DOCUMENTS

WO   WO-2013025305 A2   2/2013

OTHER PUBLICATIONS

"Graphical Timetables for Bart", [Online] http://www.drones.com/bart.html; http://www.drones.com/train-schedule.tgz, Image of a Bart timetable program, (Accessed Aug. 27, 2010), 2 pgs.
Allen, Robert B, "Interactive timelines as information system interfaces", [Online] Accessed from http://www.ischool.drexel.edu/faculty/ballen/PAPERS/TL/isdl.pdf, (Accessed on Dec. 7, 2007), 6 pgs.

(Continued)

*Primary Examiner* — Monica Pyo
(74) *Attorney, Agent, or Firm* — Schwegman Lundberg Woessner P.A.

(57) ABSTRACT

Calendar-based suggestion of travel options involves suggesting a travel option based on events stored in a calendar of a user. For example, a user in San Francisco may be scheduled for a business trip to New York, and the user's calendar may show a dinner reservation in San Francisco on Saturday, September 3 and business meeting in New York on Monday, September 5. A suggestion machine accesses calendar data of the user and travel data for several available travel options (e.g., flights from San Francisco to New York). Based on the accessed calendar data and travel data, the suggestion machine determines that one or more travel options (e.g., a flight on Sunday, September 4) are compatible with the dinner reservation and the business meeting on the user's calendar. The suggestion machine presents these compatible travel options to the user.

27 Claims, 10 Drawing Sheets

(56) References Cited

OTHER PUBLICATIONS

Casner, Stephen, "A task-analytic approach to the automated design of graphic presentations", ACM Transactions on Graphics, 10(2), University of Pittsburgh, (Apr. 1991), 111-151.

Casner, Stephen M, et al., "Cognitive Efficiency Considerations for Good Graphic Design, Technical Report", [Online] http://handle.dtic.mil/100.2/ADA218976; Corporate Author : Carnegie-Mellon University Pittsburgh Pennsylvania, (Report Date : 1989), 12 pgs.

Hornof, Anthony J, "Cognitive strategies for the visual search of hierarchical computer displays", Human-Computer Interaction, 19(3), (Sep. 2004), 41 pgs.

Norman, Donald, "Things That Make Us Smart, Defending Human Attributes in the Age of the Machine, p. 58", (1993).

Shapiro, Bill, et al., "Farebrowser: An Interactive Visualization Tool for Finding Low Airline Fares", [Online] http://www.cs.umd.edu/hcil/academics/courses/fall1999/cmsc838s/Project/billshap/, (Accessed Aug. 27, 2010), 11 pgs.

"International Application Serial No. PCT/US2012/047215, Search Report mailed Sep. 17, 2012", 2 pgs.

"International Application Serial No. PCT/US2012/047215, Written Opinion mailed Sep. 17, 2012", 6 pgs.

"International Application Serial No. PCT/US2012/047215, International Preliminary Report on Patentability mailed Jul. 22, 2013", 10 pgs.

* cited by examiner

CALENDAR-BASED SUGGESTION OF A TRAVEL OPTION

TECHNICAL FIELD

The subject matter disclosed herein generally relates to the processing of data. Specifically, the present disclosure addresses systems and methods to facilitate calendar-based suggestion of a travel option.

BACKGROUND

An online service may allow a user of the online service to view multiple options for travel plans and make a selection from among the multiple options. For example, an airline may operate a webpage that provides an online reservation service from which a user may search for available flights (e.g., from San Francisco to New York) on a particular day and then select one of the available flights for reserving a seat thereon. As another example, a hotel may operate a webpage that provides an online reservation service from which the user may search for available hotel properties and room types (e.g., in New York) for a particular period of time (e.g., September 5 through September 9) and then select one of the available room types at an available hotel property for reserving. As a further example, a restaurant may offer a webpage that provides an online reservation service from which the user may search for available table reservations (e.g., at a popular restaurant) within a particular range of times (e.g., 5:30 PM to 7:30 PM) on a particular date and then select one of the available table reservations for reserving.

BRIEF DESCRIPTION OF THE DRAWINGS

Some embodiments are illustrated by way of example and not limitation in the figures of the accompanying drawings.

DETAILED DESCRIPTION

Figure 1:
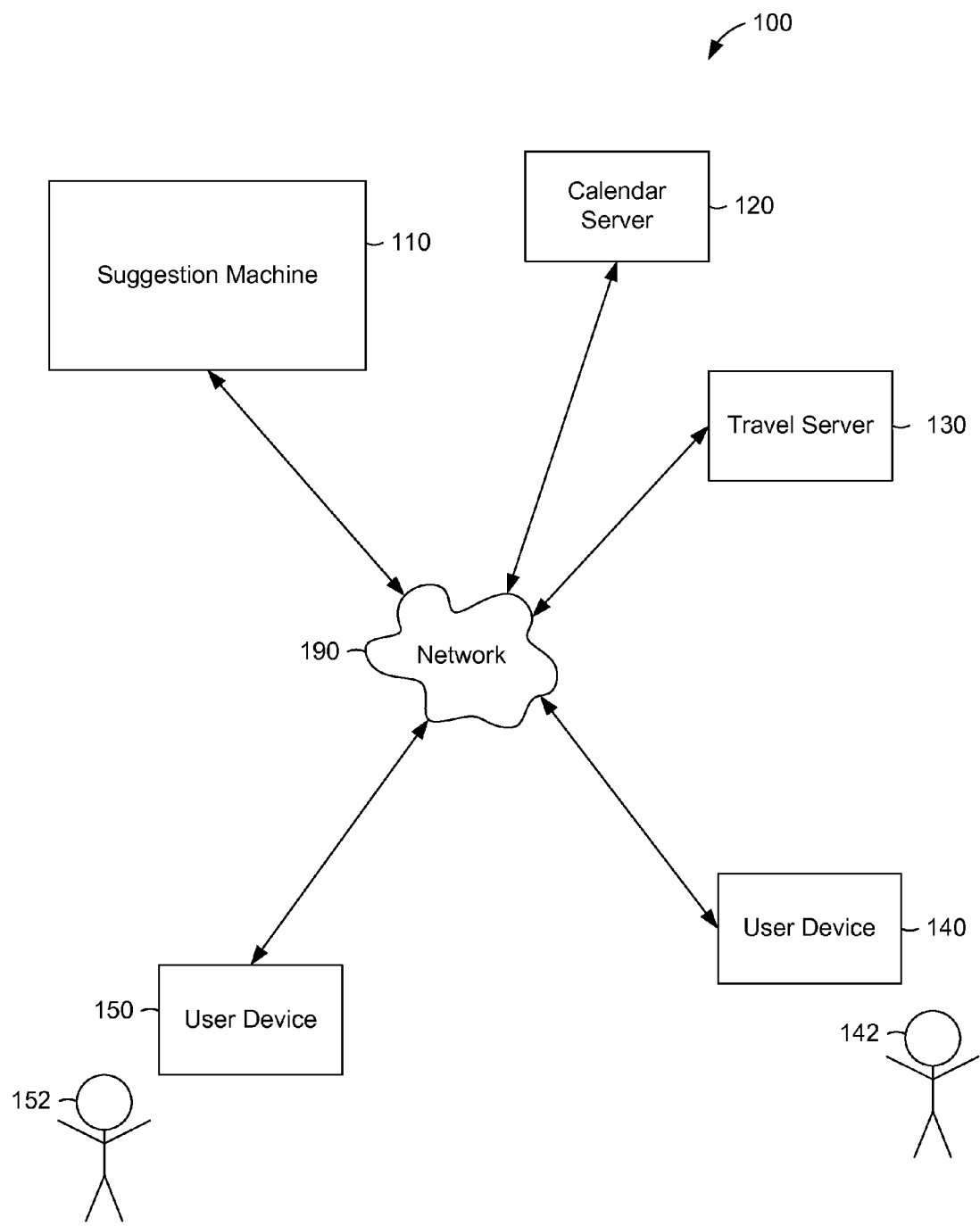
FIG. 1 is a network diagram illustrating a network environment suitable for calendar-based suggestion of a travel option, according to some example embodiments.

Example methods and systems are directed to calendar-based suggestion of one or more travel options. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Calendar-based suggestion of a travel option involves suggesting a travel option based on events stored in a calendar of a user. For example, a user in San Francisco may be scheduled for a business trip to New York, and the user's calendar may show a dinner reservation in San Francisco on Saturday, September 3 and business meeting in New York on Monday, September 5. A suggestion machine is configured to access calendar data of the user and travel data for several available travel options (e.g., flights from San Francisco to New York). Based on the accessed calendar data and travel data, the suggestion machine is configured to determine that one or more particular travel options (e.g., a flight on Sunday, September 4) are compatible with the dinner reservation and the business meeting on the user's calendar. The suggestion machine is further configured to present these compatible particular travel options to the user (e.g., as suggestions for making a selection of a flight, or as a reminder to select a flight).

As used herein, a "travel option" is an option (e.g., choice, offering, alternative, menu item, or special deal) of potential interest to a traveler (e.g., as a user of an online service) in making or executing a travel plan (e.g., an itinerary). A travel option may be a "transportation option" pertinent to a transportation service or a vehicle. Examples of transportation options include travel by airplane, train, bus, trolley, ferry, ship, taxicab, rental car, car sharing service, or any suitable combination thereof. Transportation options may include transportation services (e.g., passenger service) provided by commercial carriers (e.g., airlines, car rental companies, or cruise operators), public transportation (e.g., city buses or regional trains), private operators (e.g., limousine services, charter airplanes, or charter helicopters), or any combination thereof. In some example embodiments, the transportation option specifies that the traveler walk, jog, hike, or ride a bicycle to a particular destination. A travel option may be an "accommodation option" pertinent to an accommodation (e.g., hospitality) service. Examples of accommodation options include stays in a hotel, motel, resort, hostel, bed-and-breakfast inn, boarding house, vacation rental, home sharing service, campground, or any suitable combination thereof. Further examples of accommodation options include reservations at a restaurant, conference facility, health facility (e.g., spa, salon, or massage studio), athletic facility (e.g., gym, pool, or fitness center), or entertainment venue (e.g., theater, sports stadium, amusement park, or museum). In some situations, a travel option may be both a transportation option and an accommodation option (e.g., a compartment in a passenger train, a cabin on a cruise ship, or a bed on an overnight airline flight). A further example of a travel option is trip insurance (e.g., an insurance policy for a set of transportation options, accommodation options, or both).

FIG. 1 is a network diagram illustrating a network environment 100 suitable for calendar-based suggestion of a travel option, according to some example embodiments. The network environment 100 includes a suggestion machine 110, a calendar server 120, a travel server 130, and user devices 140 and 150, all communicatively coupled to each other via a network 190. In some example embodiments, the suggestion machine 110 and the calendar server 120 may form all or part of a calendar service system that provides calendar-related services to one or more users (e.g., event scheduling or project management). In certain example embodiments, the suggestion machine 110 and the travel server 130 may form all or part of a travel service system that provides travel-related services to one or more users (e.g., merchandising of travel options or itinerary management). In various example embodiments, the suggestion machine 110, the calendar server 120, and the travel server 130 form all or part of a combined system. The suggestion machine 110 may be implemented in a computer system, as described below with respect to FIG. 10.

The calendar server 120 functions as a data repository that stores calendar data of one or more users. In some example embodiments, the calendar server 120 is operated by a third-party calendar service (e.g., Google or Yahoo). The travel server 130 functions as a data repository that stores travel data describing one or more travel options. In certain example embodiments, the travel server 130 is operated by a third-party travel service (e.g., a travel agency, an airline, or a hotel management company).

Also shown in FIG. 1 are users 142 and 152. One or both of the users 142 and 152 may be a human user (e.g., a human being), a machine user (e.g., a software program configured to interact with the user device 140), or any suitable combination thereof (e.g., a human assisted by a machine or a machine supervised by human). The user 142 is not part of the network environment 100, but is associated with the user device 140 and may be a user of the user device 140. For example, the user device 140 may be a deskside computer, a tablet computer, or a smart phone belonging to the user 142. Similarly, the user 152 is not part of the network environment 100, but is associated with the user device 150. As an example, the user device 150 may be a tablet computer belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 10. As used herein, a "database" is a data storage resource and may store data structured as a text file, a table, a spreadsheet, a relational database, a triple store, a key-value store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., suggestion machine 110 and the user device 140). Accordingly, the network 190 may be a wired network, a wireless network (e.g., a mobile network), or any suitable combination thereof. The network 190 may include one or more portions that constitute a private network, a public network (e.g., the Internet), or any suitable combination thereof.

Figure 2:
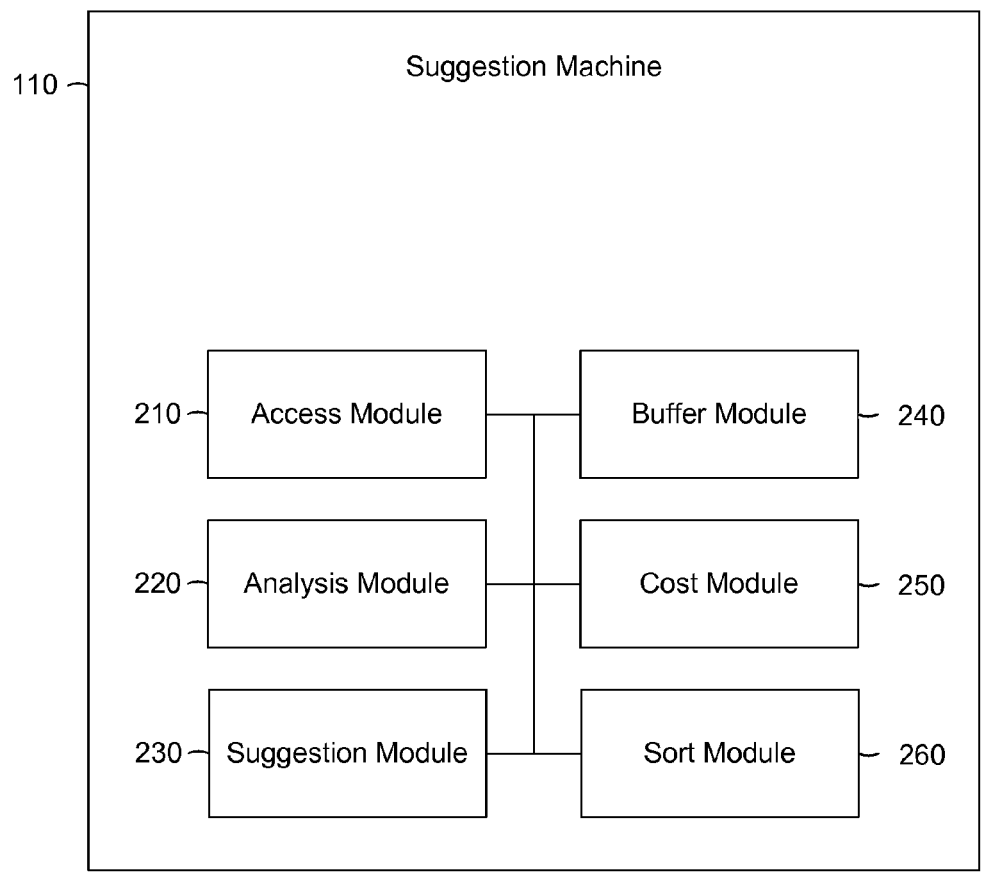
FIG. 2 is a block diagram illustrating components of a suggestion machine, according to some example embodiments.

FIG. 2 is a block diagram illustrating components of the suggestion machine 110, according to some example embodiments. The suggestion machine 110 includes an access module 210, an analysis module 220, a suggestion module 230, a buffer module 240, a cost module 250, and a sort module 260, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The access module 210 is configured to access calendar data of a user (e.g., a traveler, a potential traveler, a consumer of travel options, or a potential consumer of travel options). The access module 210 may access the calendar data from the calendar server 120. In some example embodiments, the suggestion machine 110 stores the calendar data, and the access module 210 accesses the calendar data from the suggestion machine 110. The calendar data includes information describing one or more events in the calendar of the user (e.g., scheduled for the user). Accordingly, the calendar data indicates a period of time (e.g., first period of time) during which the user is scheduled to participate in (e.g., attend) an event. For example, the calendar data may indicate that the user 142 is scheduled to attend a business meeting in New York on Monday, September 5, from 10 AM to 12 PM Eastern Time.

The access module 210 is further configured to access travel data. The access module 210 may access the travel data from the travel server 130. In some example embodiments, the suggestion machine 110 stores the travel data, and the access module 210 accesses the travel data from the suggestion machine 110. The travel data includes information describing one or more travel options available for selection by the user (e.g., transportation options or accommodation options). Accordingly, the travel data indicates a period of time (e.g., a second period of time) during which a travel option (e.g., among multiple travel options) is scheduled to occur. For example, the travel data may indicate that a transportation option (e.g., an airline flight) is scheduled to leave San Francisco at 10:30 PM Pacific Time and arrive in New York City at 7 AM Eastern Time the following day.

According to some example embodiments, the access module 210 is also configured to access additional data. The additional data may include weather data (e.g., information on storms or delays due to weather), traffic data (e.g., information on delays or closures due to accidents, road construction, or heavy traffic), passenger screening data (e.g., information on average wait time, delays, or inconveniences due to security screening of passengers), user preferences (e.g., user-submitted information or information observed from a user's behavior in one or more membership organizations, subscriptions, or websites), or any suitable combination thereof. Further examples of additional data include government notices (e.g., warnings of risks for bad weather, natural disasters, war, riots, crime, or terrorism issued by a government agency or official). The user preferences may include information (e.g., submitted by the user or observed from the user's behavior) on desired or undesired carriers, hotels, services, amenities, costs, numbers of stops, locations of stops, preparation time for meetings, or layover durations. Examples of the additional data may take the form of historical data (e.g., heavy traffic on Thanksgiving weekend for the past 10 years), real-time data (e.g., an accident report), forecast data (e.g., weather forecasts predicting thunderstorms that would delay flights, or economic forecasts predicting a high chance of revolution in a country), or any suitable combination thereof. The access module 210 may access the additional data from the suggestion machine 110, the calendar server 120, the travel server 130, one or more additional servers connected to the network 190 (e.g., operated by one or more third parties), or any suitable combination thereof. For example, the additional data may indicate that the period of time (e.g., the second period of time) scheduled for the travel option is likely to be lengthened by 60 minutes due to a combination of delays stemming from bad weather, bad traffic, and large crowds going through airport security in San Francisco (e.g., as predicted from historical data, real-time data, forecast data, or any suitable combination thereof). As another example, the additional data may indicate that the user 142 prefers nonstop flights costing under $500 and that layovers be longer than 30 minutes but no longer than 90 minutes.

The analysis module 220 is configured to analyze the calendar data and the travel data (e.g., accessed by the access module 210) and determine a set of one or more travel options that are compatible with the one or more events described in the calendar data. The analysis module 220 may make the determination that a travel option is compatible with an event of the user 142 based on the period of time (e.g., the first period of time) for the event, on the period of time (e.g., the second period of time) for the travel option, or on both. For example, the analysis module 220 may determine that the airline flight scheduled to leave San Francisco at 10:30 PM Pacific Time and arrive in New York City at 7 AM Eastern Time the following day is compatible with the business meeting in New York on Monday, September 5, from 10 AM to 12 PM Eastern Time.

The suggestion module 230 is configured to present one or more travel options determined (e.g., by the analysis module 220) as being compatible with one or more events of the user 142. For example, the suggestion module 230 may present the airline flight scheduled to leave San Francisco at 10:30 PM Pacific Time and arrive in New York City at 7 AM Eastern Time the following day as being compatible with the business meeting in New York on Monday, September 5, from 10 AM to 12 PM Eastern Time. According to various example embodiments, the suggestion module 230 presents the travel option to the user 142 (e.g., via the user device 140), to a friend of the user 142 (e.g., to the user 152 via the user device 150), to an assistant of the user 142 (e.g., to the user 152 by the user device 150), to another participant in the event of the user 142 (e.g., to the user 152 by the user device 150), or any suitable combination thereof. The suggestion module 230 may present the travel option by displaying or causing the display of a webpage (e.g., of a travel option search service), a notification (e.g., a pop up window), a message (e.g., an email message, instant message, or a text message), or any suitable combination thereof. In some example embodiments, the suggestion module 230 presents the travel option in a communication directed at the user 142, in a communication addressed to the user device 140, or both. Such a communication may present the travel option among multiple travel options (e.g., for consideration by the user 142).

The buffer module 240 is configured to determine a threshold period of time for comparison to a period of time (e.g., a third period of time) by which the period of time for the event (e.g., the first period of time) is separated from the period of time for a travel option (e.g., the second period of time). For example, the threshold period of time may be a minimum period of time (e.g., a minimum buffer time) or a maximum period of time (e.g., a maximum buffer time). Accordingly, the threshold period of time may represent a minimum or maximum buffer time between the event and the travel option. As used herein, a "buffer time" is a period of time between the period of time for an event and the period of time for a travel option, between the periods of time for two travel options, between the periods of time for two events, or between a period of time between two portions of a single travel option (e.g., a layover between two legs of a journey). For example, an airline flight that arrives in New York City at 7 AM Eastern Time the following day may arrive three hours prior to a business meeting scheduled in New York City on that day at 10 AM Eastern Time. Compared to a minimum buffer time of two hours, such a three-hour buffer time is compatible with this minimum buffer time. The buffer module 240 is also configured to determine that the period of time (e.g., the third period of time) by which the period of time for the event (e.g., the first period of time) is separated from the period of time for the travel option (e.g., the second period of time) transgresses the threshold period of time (e.g., the minimum or maximum period of time). For example, the buffer module 240 may determine that the buffer time exceeds a maximum buffer time or falls below a minimum buffer time. The analysis module 220 may determine that the travel option is compatible with the event based on this determination by the buffer module 240. According to various example embodiments, the buffer module 240 may determine the threshold period of time based on a location of the event (e.g., as indicated by the calendar data accessed by the access module 210), on the additional data (e.g., accessed by the access module 210), or any suitable combination thereof.

The cost module 250 is configured to determine that a travel option is less expensive (e.g., monetarily) than another travel option (e.g., a further travel option) among multiple travel options (e.g., as indicated by the travel data accessed by the access module 210). In some example embodiments, the cost module 250 is configured to determine that the travel option has a fewer number of stops than another travel option (e.g., the further travel option) among the multiple travel options. In this manner, the cost module 250 may rank any number of travel options by monetary expense (e.g., price), number of stops, or any suitable combination thereof (e.g., an "agony" score calculated from price, number of stops, total duration of a transportation option, etc.).

The sort module 260 is configured to generate a presentation of one or more travel options for presentation by the suggestion module 230. The sort module 260 may generate the presentation based on one or more determinations performed by the cost module 250 (e.g., one or more ranked travel options). According to various example embodiments, the sort module 260 generates the presentation based on the calendar data (e.g., a list of attendees for an event), the travel data (e.g., a list of amenities at an accommodation near the event), or any suitable combination thereof. For example, if the calendar data indicates that the user 142 is attending an event with his two children, the sort module 260 may elevate or otherwise visually highlight a stay at kid-friendly hotel with free video games and a highly rated swimming pool. As another example, if the calendar data indicates that the user 142 is attending an event with wealthy business clients, the sort module 260 may elevate or otherwise visually highlight a stay at a high-end luxury hotel with sophisticated conference facilities. As a further example, if the calendar data indicates that the user 142 is attending an event with his wife near their wedding anniversary date, the sort module 260 may elevate or otherwise visually highlight a stay at a romantic bed-and-breakfast inn near the event.

Figure 3:
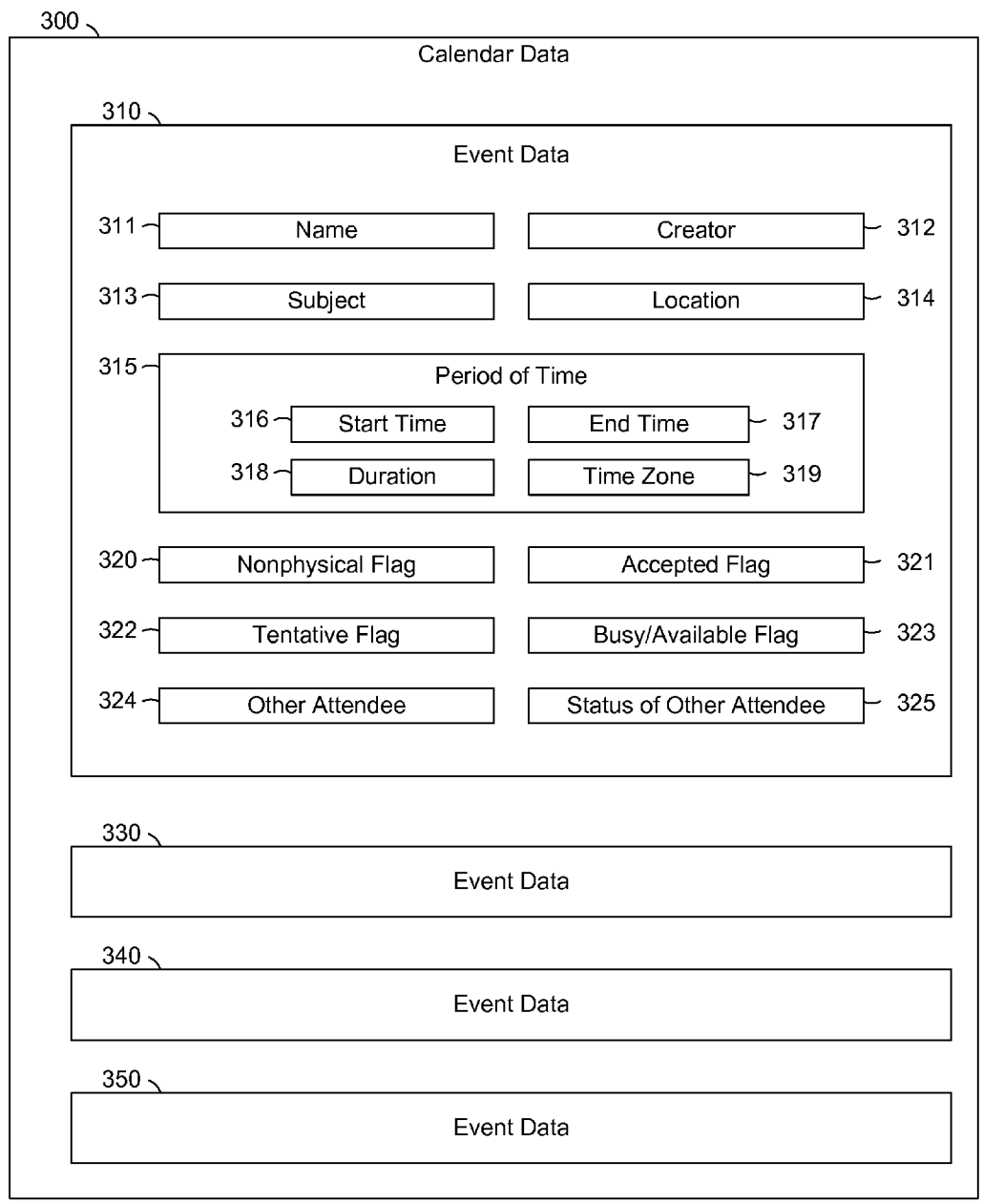
FIG. 3 is a block diagram illustrating calendar data accessed by the suggestion machine, according to some example embodiments.

FIG. 3 is a block diagram illustrating calendar data 300 (e.g., as accessed by the access module 210), according to some example embodiments. The calendar data 300 includes information describing one or more events. As shown, event data 310 describes an event (e.g., a phone call, a business meeting, a multi-day conference, or a week-long vacation). Similarly, event data 330, 340, and 350 describe additional events (e.g., each event having its own location). The calendar data 300 may be limited to events of a single user (e.g., user 142). In some example embodiments, the calendar data 300 includes events for multiple users (e.g., user 142 and user 152). According to various example embodiments, one or more of the following data structures may be omitted.

The event data 310 includes a name 311 of an event (e.g., a title), a creator 312 of the event (e.g., the user 142 or an assistant thereof), a subject 313 of the event (e.g., a description or note), and a location 314 of the event (e.g., room number, floor number, venue name, address, city, state, country, cross streets, or global positioning system (GPS) coordinates). The event data 310 also includes a period of time 315 for the event. The period of time 315 includes a start time 316 (e.g., 10 AM), an end time 317 (e.g., 12 PM), a duration 318 (e.g., two hours), and a time zone 319 (e.g., Eastern Time). In some example embodiments, the period of time 250 includes multiple time zones (e.g., time zone 319). According to various example embodiments, the event data 310 includes a nonphysical flag 320 (e.g., indicating that the event is a virtual or online event), an accepted flag 321 (e.g., indicating that the event has been accepted into the calendar of the user 142), a tentative flag 322 (e.g., indicating that the event is tentatively scheduled for the user 142), and a busy/available flag 323 (e.g., indicating whether the user 142 is busy or available for additional events during the period of time 315). Moreover, in some example embodiments, the event data 310 includes information on one or more additional attendees. As shown, the event data 310 includes an "other" attendee 324 of the event (e.g., a name of another attendee) and a status 325 of the other attendee (e.g., whether the other attendee 324 is scheduled to attend the event). In various example embodiments, the other attendee 324 is a friend, family member, coworker, colleague, or a client of the user 142 (e.g., user 152). In certain example embodiments, multiple "other" attendees are specified in the event data 310. Each of the event data 330, 340, and 350 may include information similar to that described for the event data 310.

Figure 4:
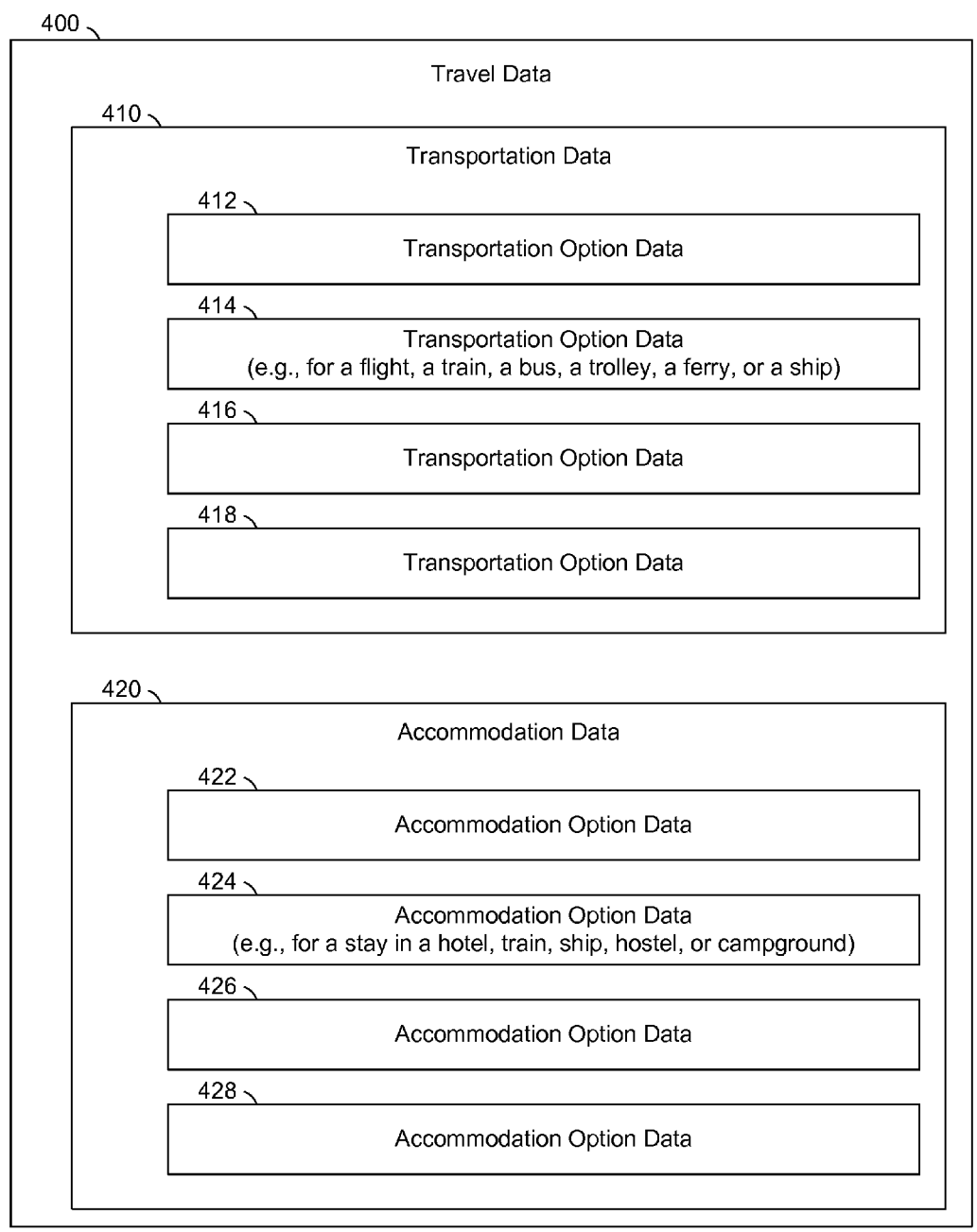
FIG. 4 is a block diagram illustrating travel data accessed by the suggestion machine, according to some example embodiments.

FIG. 4 is a block diagram illustrating travel data 400, according to some example embodiments. The travel data 400 includes information describing one or more travel options. According to various example embodiments, the travel data 400 may include transportation data 410, accommodation data 420, or both. According to various example embodiments, one or more of the following data structures may be omitted.

The transportation data 410 includes information describing one or more transportation options. As shown, transportation option data 412 describes a transportation option (e.g., an airline flight). For example, the transportation option data 412 may include flight information referencing an airline flight, schedule information for a transportation service that corresponds to a particular vehicle (e.g., bus, trolley, ferry, taxicab, car rental, or ship), or any suitable combination thereof. Similarly, transportation option data 414, 416, and 418 describe additional transportation options. The transportation data 410 may be limited to transportation options available from a single transportation service (e.g., a single airline). In some example embodiments, the transportation data 410 includes transportation options available from multiple transportation services (e.g., multiple airlines, operators, car rental companies, and bus operators).

The accommodation data 420 includes information describing one or more accommodation options. As shown, accommodation option data 422 describes an accommodation option (e.g., a hotel stay). Similarly, accommodation option data 424, 426, and 428 describe additional accommodation options. The accommodation data 420 may be limited to accommodation options available from a single accommodation provider (e.g., a single hotel). In some example embodiments, the accommodation data 420 includes accommodation options available from multiple accommodation providers (e.g., multiple hotels, hotel chains, motels, bed-and-breakfast inns, and campgrounds).

Figure 5:
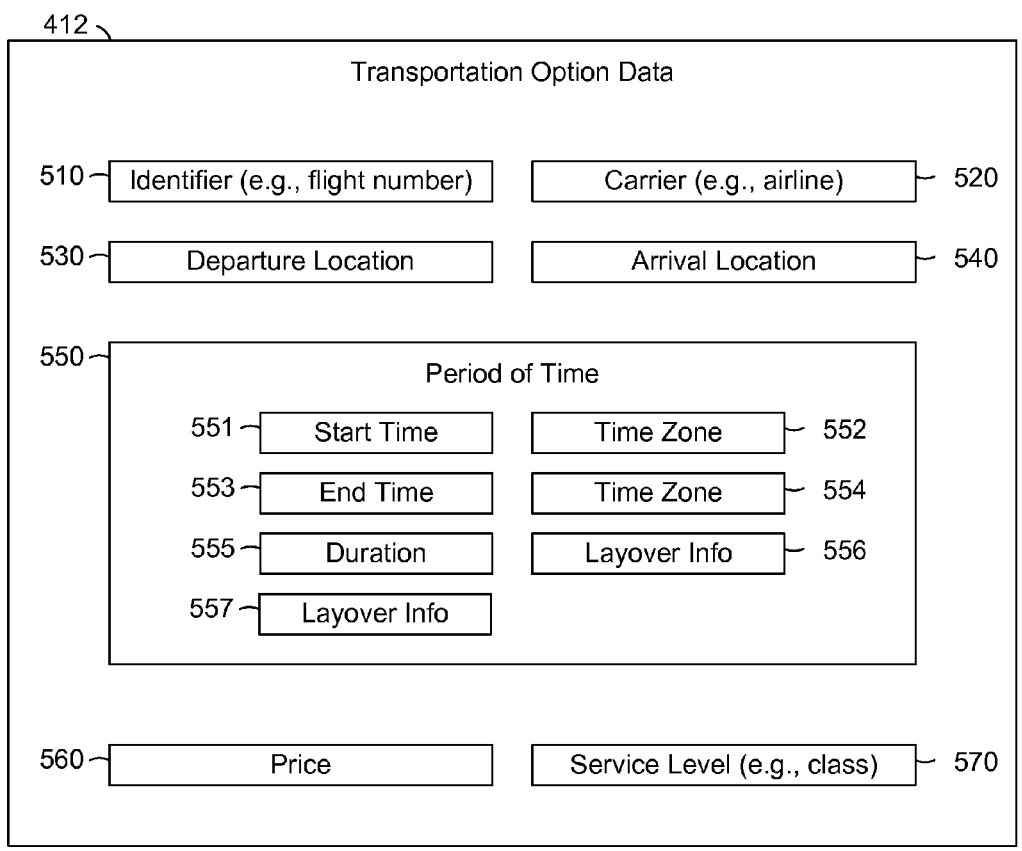
FIG. 5 is a block diagram illustrating transportation option data accessed by the suggestion machine, according to some example embodiments.

FIG. 5 is a block diagram illustrating the transportation option data 412, according to some example embodiments. The transportation option data 412 is discussed as being representative of the transportation option data 414, 416, and 418. According to various example embodiments, one or more of the following data structures may be omitted.

The transportation option data 412 includes an identifier 510 of a transportation option (e.g., a flight number for an airline flight) and a carrier 520 for the transportation option (e.g., an airline name). The carrier 520 may be a name of a transportation service or provider thereof (e.g., Delta Air Lines® or Carnival Cruises®). In some example embodiments, the carrier 520 may be "walk" or some other indication that selection of this transportation option would schedule the user 142 to transport himself. The transportation option data 412 includes a departure location 530 (e.g., a departure city, airport, train station, bus stop, address, venue, or accommodation). Also included in the transportation option data 412 is an arrival location 540 (e.g., an arrival city, airport, train station, bus stop, address, venue, or accommodation). The transportation option data 412 includes a period of time 550 for the transportation option. The period of time 550 includes a start time 551 (e.g., 10:30 PM), a time zone 552 for the start time 551 (e.g., Pacific Time), and end time 553 (e.g., 7 AM), a time zone 554 for the end time 553 (e.g., Eastern Time), a duration 555 (e.g., five hours and thirty minutes), and layover information 556 and 557. The layover information 556 may describe a scheduled stop within the transportation option. In particular, a layover time may be described in the layover information 556 (e.g., a thirty minute layover in Atlanta at 6 AM Eastern Time). The layover information 557 may describe another scheduled stop and its corresponding layover time. Moreover, in some example embodiments, the transportation option data 412 includes a price 560 of the transportation option (e.g., $317) and a service level 570 of the transportation option (e.g., an airline class of service).

Figure 6:
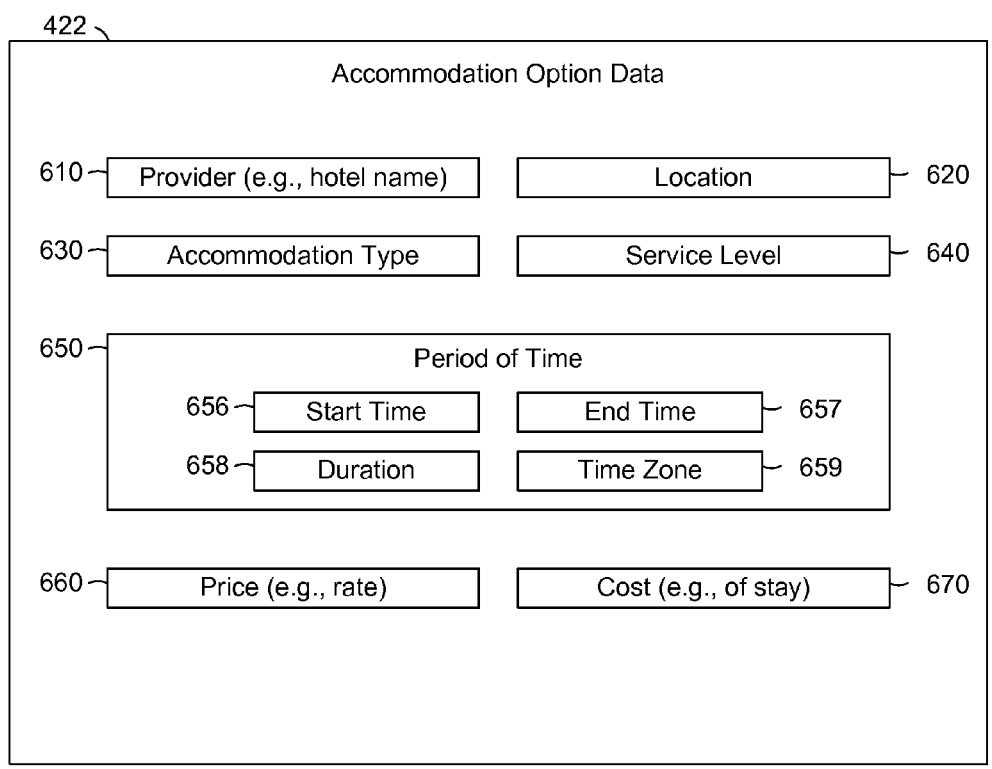
FIG. 6 is a block diagram illustrating accommodation option data accessed by the suggestion machine, according to some example embodiments.

FIG. 6 is a block diagram illustrating accommodation option data 422, according to some example embodiments. The accommodation option data 422 is discussed as being representative of the accommodation option data 424, 426, and 428. According to various example embodiments, one or more of the following data structures may be omitted.

The accommodation option data 422 includes a provider 610 of the accommodation option (e.g., a name of a particular hotel), a location 620 of the accommodation option (e.g., address, city, state, country, cross streets, or GPS coordinates), an accommodation type 630 of the accommodation option (e.g., style of room or permissibility of smoking), and a service level 640 of the accommodation option (e.g., whether any special deals, perks, benefits, or loyalty rewards apply). The accommodation option data 422 includes a period of time 650 for the accommodation option. The period of time 650 includes a start time 656 (e.g., a check-in date or a check-in time on a date of arrival), an end time 657 (e.g., a check-out date or a check-out time on a date of departure), a duration 658 (e.g., five days, four nights), and a time zone 659 of the accommodation option (e.g., Eastern Time). Moreover, in some example embodiments, the accommodation option data 422 may include a price 660 (e.g., a rate per night) and a cost 670 (e.g., a total cost for the full stay).

Figure 7:
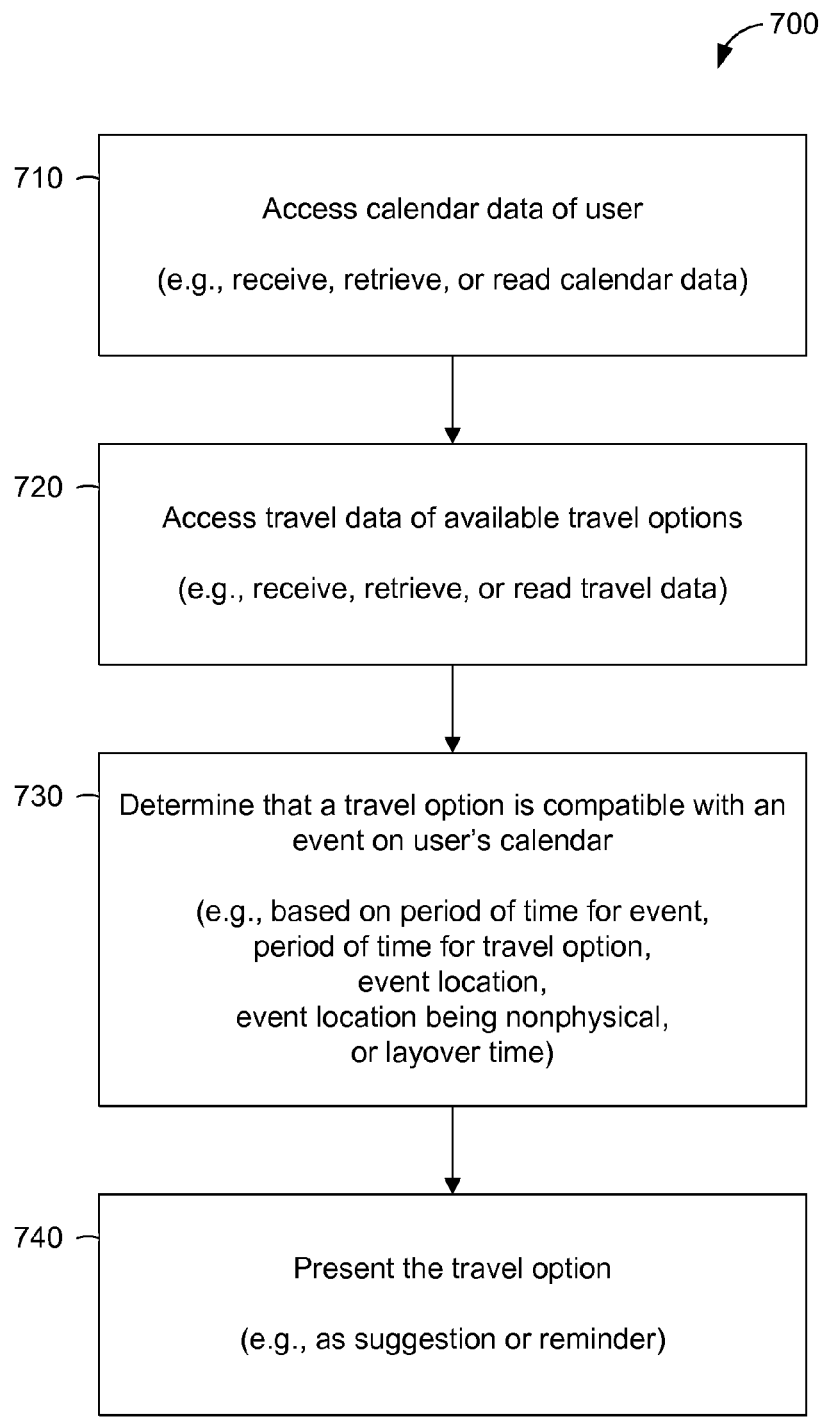
FIG. 7-9 are flowcharts illustrating operations in a method of calendar-based suggestion of a travel option, according to some example embodiments.
Figure 8:
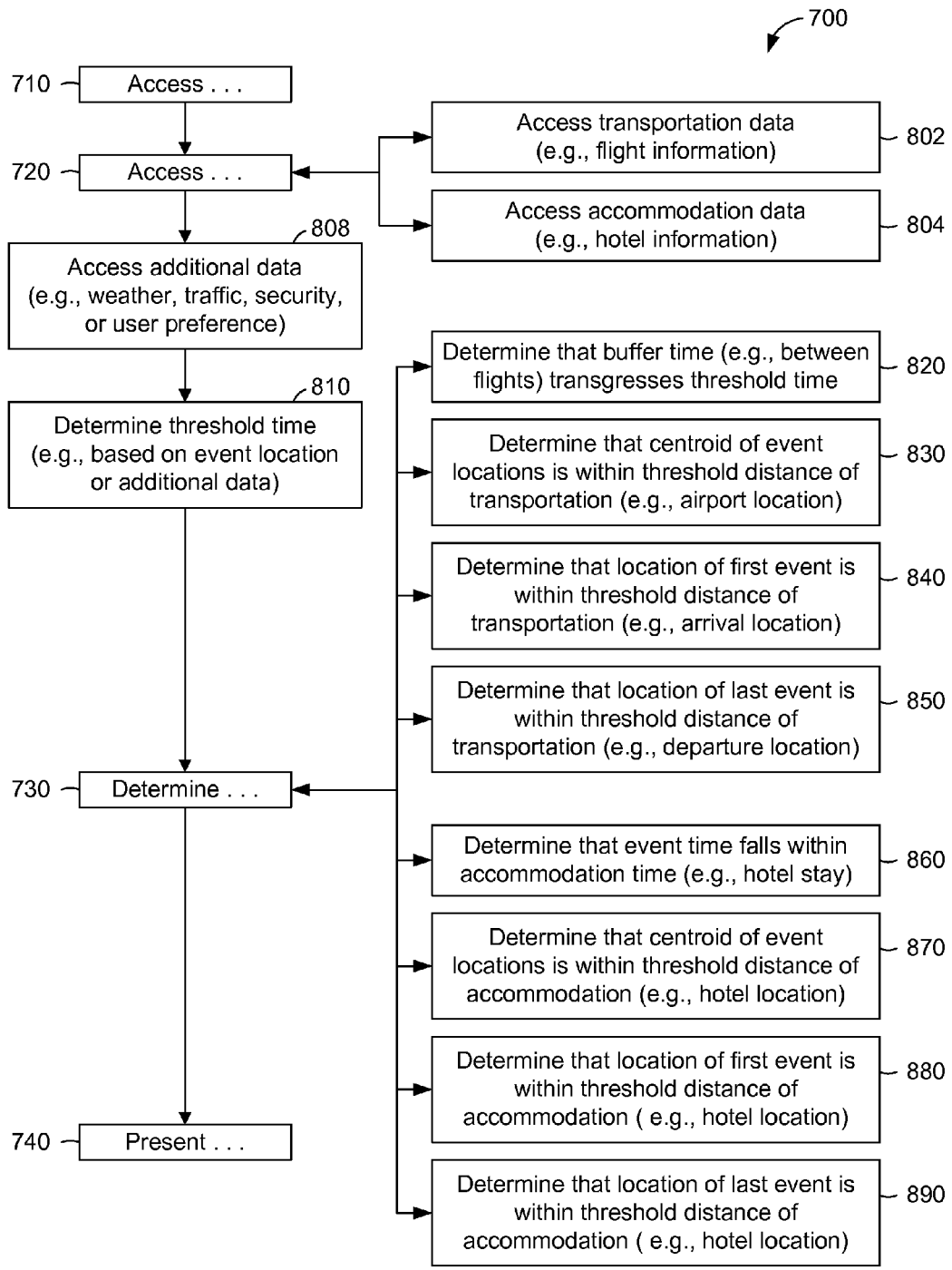
Figure 9:
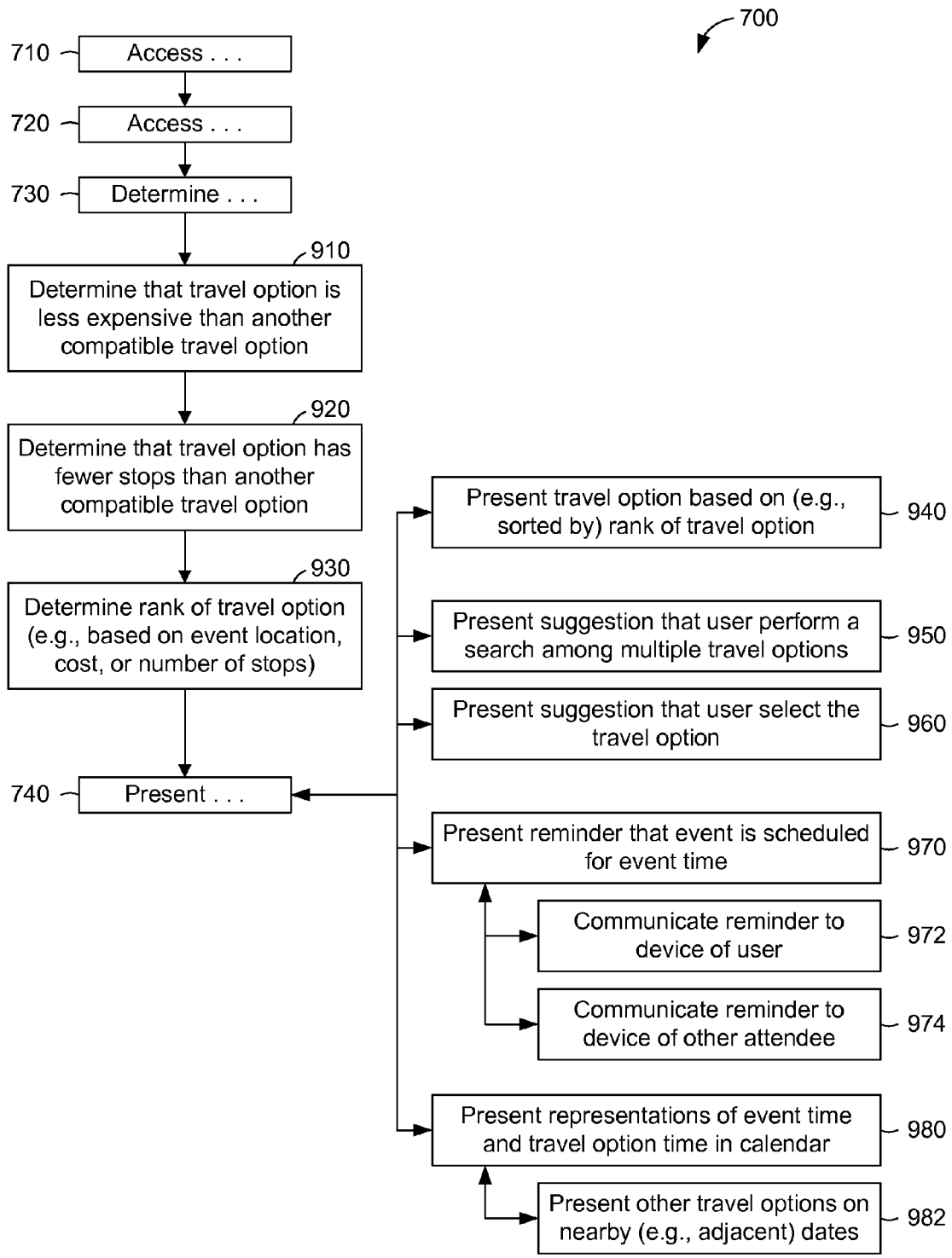

FIG. 7-9 are flowcharts illustrating operations in a method 700 of calendar-based suggestion of a travel option (e.g., as described by transportation option data 412 or accommodation option data 422), according to some example embodiments. Operations in the method 700 may be performed by the suggestion machine 110, using modules described above with respect to FIG. 2. As shown in FIG. 7, the method 700 includes operations 710, 720, 730, and 740.

In operation 710, the access module 210 accesses the calendar data 300 (e.g., from the calendar server 120). The calendar data 300 may be specific to the user 142. Moreover, the calendar data 300 may indicate the period of time 315 (e.g., a first period of time) during which the user 142 is scheduled to participate in an event (e.g., a business meeting). In some example embodiments, operation 710 is performed by invoking an application programming interface (API) (e.g., a public API) provided by a third-party calendar service (e.g., Google®) to access the calendar data 300. For example, the API may be invoked in response to the user 142 providing log in credentials (e.g., username and password) to identify or authenticate himself to the suggestion machine 110, to the calendar server 120, to the travel server 130, or any suitable combination thereof. In certain example embodiments, operation 710 is performed by receiving the calendar data 300 from the calendar server 120. As an example, the calendar data 300 may be received from the calendar server 120 in response to a request submitted by the user 142 to the calendar server 120. As another example, the calendar data 300 may be received from the calendar server 120 as part of a data feed (e.g., a periodic or repeating download) arranged or authorized by the user 142. According to various example embodiments, operation 710 is performed in response to a query submitted by the user 142 (e.g., via the user device 140). For example, the user 142 may query the name of a city (e.g., San Francisco or New York City), and the access module 210 may access the calendar data 300 in response to the submission of the query (e.g., as detected by the suggestion machine 110, the calendar server 120, the travel server 130, or any suitable combination thereof).

In operation 720, the access module 210 accesses travel data 400 (e.g., from the travel server 130). The travel data 400 may indicate multiple travel options available for selection by the user 142. Moreover, the travel data 400 indicates a period of time (e.g., period of time 550 or period of time 650) during which a travel option is scheduled to occur. In some example embodiments, the travel data 400 may indicate the period of time 550 (e.g., a second period of time) during which the transportation option that corresponds to the transportation option data 412 is scheduled to occur. In certain example embodiments, the travel data 400 may indicate the period of time 650 (e.g., the second period of time) during which the accommodation option that corresponds to the accommodation option data 422 is scheduled to occur. According to various example embodiments, operation 720 is performed in response to a query submitted by the user 142 (e.g., via the user device 140). For example, the user 142 may query the name of a city (e.g., San Francisco or New York City), and the access module 210 may access the travel data 400 in response to the submission of the query (e.g., as detected by the suggestion machine 110, the calendar server 120, the travel server 130, or any suitable combination thereof).

In operation 730, the analysis module 220 determines that the travel option is compatible with the event in which the user 142 is scheduled to participate. This determination may be based on the period of time 315 (e.g., as indicated by the calendar data 300), on the period of time during which the travel option is scheduled to occur (e.g., period of time 550 or period of time 650), or both.

In some example embodiments, the travel option is a transportation option (e.g., among multiple transportation options), and operation 730 includes determining that no portion of the period of time during which the transportation option is scheduled to occur coincides with any portion of the period of time 315 during which the user 142 is the scheduled to participate in the event. In other words, the determination that the travel option is compatible with the event may be based on there being no overlap between the period of time 315 and the period of time 550.

In certain example embodiments, the analysis module 220 determines that the travel option is compatible with the event based on the location 314 of the event. Moreover, the location 314 may be indicated as a nonphysical location (e.g., by the nonphysical flag 320). For example, the event may be a scheduled phone call, teleconference, or online chat session, and the location 314 of the event may be indicated as being "virtual" or "online." Since the user 142 may be able to participate in an event at a nonphysical location while using a particular travel option, the analysis module 220 may determine that the particular travel option is compatible with such an event, despite the period of time 315 for the event coinciding, at least in part, with the period of time corresponding to the particular travel option (e.g., period of time 550 or period of time 650). This determination may be based on the location of the event being nonphysical (e.g., as indicated by the nonphysical flag 320). For example, the user 142 may participate in a scheduled phone call while traveling on a train.

In various example embodiments, the analysis module 220 determines that the travel option is compatible with the event based on a layover time (e.g., a third period of time) encompassing the period of time 315 for an event (e.g., a first period of time). For example, if an event (e.g., a phone call) is a nonphysical event (e.g., as indicated by the nonphysical flag 320) scheduled to occur during the layover time (e.g., between airline flights), the user 142 may be able to participate in the event while using the travel option. Accordingly, the analysis module 220 may determine that the travel option is compatible with the event based on the layover time, the nonphysical flag 320, or both.

In operation 740, the suggestion module 230 presents the travel option that is determined to be compatible with the event. For example, the suggestion module 230 may present the travel option as a suggestion, as a reminder, or both. Moreover, the suggestion module 230 may present the travel option to the user 142 (e.g., via the user device 140). According to some example embodiments, the suggestion module 230 presents the travel option to the user 152 (e.g., via the user device 150), where the user 152 may be related to the user 142 (e.g., an assistant, friend, family member, colleague, client, or a fellow event attendee). The travel option may be presented by displaying or causing the display of a webpage (e.g., of a travel option search service), a notification (e.g., a pop up window), a message (e.g., an email message, instant message, or a text message). Further details of the method 700 are discussed below with respect to FIG. 8-9.

As shown in FIG. 8, various example embodiments of the method 700 may include one or more of operations 802, 804, 808, 810, 820, 830, 840, 850, 860, 870, 880, and 890. One or both of operations 802 and 804 may be performed as part (e.g., a precursor task, a subroutine, or a portion) of operation 720. Similarly, one or more of operations 820-890 may be performed as part of operation 730.

In operation 802, the access module 210 accesses the transportation data 410, which is described above with respect to FIG. 4. For example, the access module 210 may access the transportation data 410 from the travel server 130. In operation 804, the access module 210 accesses the accommodation data 420, which is also described above with respect to FIG.

4. As an example, the access module 210 may access the accommodation data 420 from the travel server 130.

In operation 808, the access module 210 accesses additional data (e.g., as described above with respect to FIG. 2). According to various example embodiments, the additional data may include weather data (e.g., information on storms or delays due to weather), traffic data (e.g., information on accidents or delays due to traffic), passenger screening data (e.g., information on average wait time, delays, or problems due to security screening of passengers), user preferences (e.g., information submitted by, or observed from the behavior of, the user 142), government notices (e.g., warnings), or any suitable combination thereof. In example embodiments that include operation 808, the analysis module 220 may perform operation 730 based on at least some of the additional data.

In operation 810, the buffer module 240 determines a threshold period of time (e.g., as described above with respect to FIG. 2). The threshold period of time may be determined based on the data accessed by the access module 210 (e.g., the additional data discussed above with respect to operation 808). For example, the buffer module 240 may determine the threshold period of time based on the location 314 of an event (e.g., as stored in the calendar data 300). As another example, the threshold period of time may be determined based on the additional data accessed in operation 808.

In operation 820, the analysis module 220 determines (e.g., as part of operation 730) that a buffer time transgresses a threshold period of time (e.g., as determined in operation 810). In some example embodiments, the analysis module 220 determines that the period of time 315 for an event (e.g., a first period of time) is separated from the period of time 550 for a transportation option (e.g., a second period of time) by a buffer time. In certain example embodiments, the analysis module 220 determines that the period of time 315 for the event is separated from the period of time 650 for an accommodation option (e.g., the second period of time) by the buffer time. Having determined the buffer time, the analysis module 220 may determine that the buffer time transgresses the threshold period of time determined in operation 810. This may have the effect of determining that a travel option is compatible with an event on the basis of the buffer time being greater than a minimum buffer time, less than a maximum buffer time, or any suitable combination thereof.

In operation 860, the analysis module 220 determines that the period of time 315 for an event (e.g., the first period of time) falls within the period of time 650 for an accommodation option (e.g., the second period of time), according to some example embodiments. This may have the effect of determining that an event (e.g., a physical event) is scheduled to start and ended during an accommodation option. For example, a vacation to Hawaii may be indicated as a physical event (e.g., by absence of the nonphysical flag 320), and the analysis module 220 may determine that an accommodation option (e.g., a hotel stay) is compatible with the vacation, based on the period of time for the vacation (e.g., period of time 315) falling within a period of time for the accommodation option (e.g., period of time 650). In certain example embodiments, the analysis module 220 determines that the period of time 315 falls within the period of time 550 for a transportation option (e.g., the second period of time). This may have the effect of determining that an event (e.g., a nonphysical event) is scheduled to start and end during a transportation option. As an example, a scheduled teleconference may be indicated as a nonphysical event (e.g., by the nonphysical flag 320), and the analysis module 220 may determine that a transportation option (e.g., a train ride) is compatible with the scheduled teleconference, based on the period of time for the teleconference (e.g., period of time 315) falling within a period of time for the transportation option (e.g., period of time 550).

According to various example embodiments, the calendar data 300 includes locations (e.g., location 314) of multiple events (e.g., event data 310, 330, 340, and 350). For example, the user 142 may be scheduled to attend multiple business meetings during a single business trip. The calendar data 300 may indicate a sequence of multiple events (e.g., including the event corresponding to the event data 310). Moreover, the sequence of multiple events may include an initial (e.g., first) event at an initial (e.g., first) location, as well as a final (e.g., last) event at a final (e.g., last) location. By performing one or more of operations 830, 840, 850, 870, 880, and 890, the analysis module 220 may base the determination performed in operation 730 on one or more locations of these events, a location corresponding to a particular travel option, or any suitable combination thereof. In some example embodiments, the analysis module 220 may base the determination performed in operation 730 on one or more distances (e.g., calculated, received, accessed, or looked up from a table) from the location corresponding to a particular travel option.

In operation 830, the analysis module 220 calculates a centroid of multiple event locations (e.g., location 314) and determines that the centroid is within a threshold distance of a location for a transportation option (e.g., an airline flight). For example, the analysis module 220 may determine that the centroid is within a threshold distance of the departure location 530, the arrival location 540, or both. This may have the effect of determining that the transportation option is conveniently located with respect to the multiple event locations. In some example embodiments, a particular event location is used for more than one event among multiple events, and the calculation of the centroid may accord greater weight to this particular event location.

In operation 870, the analysis module 220 calculates a centroid of multiple event locations (e.g., location 314) and determines that a centroid is within a threshold distance of a location for an accommodation option (e.g., a hotel stay). For example, the analysis module 220 may determine that the centroid is within a threshold distance of the location 620 (e.g., of a hotel). This may have the effect of determining that the accommodation option is conveniently located with respect to the multiple event locations.

In operation 840, the analysis module 220 determines that the arrival location 540 of a transportation option is within a threshold distance of an initial location (e.g., location 314) among multiple event locations. This may have the effect of determining that the transportation option provides the user 142 with convenient access to the initial event after using the transportation option.

In operation 850, the analysis module 220 determines that the departure location 530 of a transportation option is within a threshold distance of a final location (e.g., location 314) among multiple event locations. This may have the effect of determining that the transportation option provides the user 142 with convenient access to the transportation option after the final event in a sequence of multiple events.

In operation 880, the analysis module 220 determines that an initial location (e.g., location 314) among multiple event locations is within a threshold distance of the location 620 of an accommodation option. This may have the effect of determining that the accommodation option provides the user 142 with convenient access to the initial event from the accommodation option.

In operation 890, the analysis module 220 determines that a final location (e.g., location 314) among multiple event locations is within a threshold distance of the location 620 of an accommodation option. This may have the effect of determining that the accommodation option provides the user 142 with convenient access to the accommodation option from the final event.

As shown in FIG. 9, various example embodiments of the method 700 may include one or more of operations 910, 920, 930, 940, 950, 960, 970, 972, 974, 980, and 982. One or more of operations 940-982 may be performed as part (e.g., a precursor task, a subroutine, or a portion) of operation 740.

In operation 910, the cost module 250 determines that a particular travel option (e.g., corresponding to transportation option data 412 or accommodation option data 422) is less expensive than another compatible travel option (e.g., corresponding to transportation option data 414 or accommodation option data 424). This may have the effect of enabling the cost module 250 to rank travel options by monetary expense (e.g., price or cost).

In operation 920, the cost module 250 determines that a particular travel option (e.g., corresponding to transportation option data 412) has fewer stops than another compatible travel option (e.g., corresponding to transportation option data 414). This may have the effect of enabling the cost module to rank travel options by number of stops.

In operation 930, the cost module 250 determines a rank of a travel option (e.g., corresponding to transportation option data 412 or accommodation option data 422). The cost module 250 may determine ranks for multiple travel options. The rank of a particular travel option may be determined based on the location 314 of an event, a location corresponding to the particular travel option (e.g., departure location 530, arrival location 540, or location 620 of an accommodation option), or any suitable combination thereof. Moreover, the rank of the particular travel option may be determined based on monetary expense (e.g., as described above with respect to operation 910). Furthermore, the rank of the particular travel option may be determined based on a number of stops (e.g., as described above with respect to operation 920). This may have the effect of enabling the sort module 260 to generate the presentation of one or more travel options based on one or more ranks determined in operation 930, which in turn may enable the suggestion module 230 to present the presentation generated by the sort module 260.

In operation 940, the suggestion module 230 presents a travel option (e.g., as determined in operation 730 to be compatible with the event) based on a rank of the travel option. For example, the travel option may be presented in a list of compatible travel options, where the list is sorted by rank.

In operation 950, the suggestion module 230 presents the travel option by presenting a suggestion that the user 142 perform a search for one or more similar travel options among multiple travel options. For example, the travel option determined in operation 730 may be presented with a message stating, "Click here to search for flights like this for your upcoming business trip!"

In operation 960, the suggestion module 230 presents the travel option by presenting a suggestion that the user 142 select (e.g., buy, reserve, or book) the travel option. For example, the travel option determined in operation 730 may be presented with a message stating, "This hotel stay fits your business trip. Click here to reserve it now!"

In operation 970, the suggestion module 230 presents the travel option by presenting a reminder that the event is scheduled to occur during the period of time 315 for the event. According to various example embodiments, one or more of operations 972 and 974 may be performed as part (e.g., a precursor task, a subroutine, or a portion) of operation 970. In operation 972, the reminder is communicated to the user device 140 (e.g., for the user 142). For example, the travel option determined in operation 730 may be presented with a message stating, "Your business trip to New York is coming up on September 5. Better get a flight soon!" Communications to the user device 140 may be addressed to the user device 140, to the user 142, or to both. In operation 974, the reminder is communicated to the user device 150 (e.g., for the user 152, who may be an assistant of the user 142, a friend of the user 142, a family member of the user 142, a colleague of the user 142, a client of the user 142, or another attendee of the event). As an example, the travel option determined in operation 730 may be presented with a message stating, "John's business trip to New York is coming up on September 5, but he hasn't booked a flight yet." Communications to the user device 150 may be addressed to the user device 150, to the user 152, or to both. According to some example embodiments, the travel option may be presented with a map (e.g., a geographical map of a city) that depicts one or more locations of events, travel options, or any suitable combination thereof (e.g., as pins or markers within the map).

In operation 980, the suggestion module 230 presents a calendar (e.g., showing one or more months) with a representation of the period of time 315 for an event (e.g., a representation of a first period of time) and a representation of the period of time corresponding to the travel option determined in operation 730 (e.g., a representation of a second period of time). For example, the calendar may include representations of the period of time 315 and of the period of time 550 for a transportation option. As another example, the calendar may include representations of the period of time 315 and of the period of time 650 for an accommodation option. This may have the effect of indicating (e.g., to the user 142) that there is no conflict between the event and the travel option determined in operation 730. In some example embodiments, the calendar indicates one or more periods of time as blocks (e.g., rectangular shapes) within a chart or grid, and a particular block may indicate that a corresponding period of time is available or unavailable for scheduling a travel option. Moreover, the calendar may indicate a previously selected travel option (e.g., as suggested by the method 700) as a previously scheduled event within the calendar (e.g., a tentatively scheduled event).

According to various example embodiments, operation 982 may be performed as part (e.g., a precursor task, a subroutine, or a portion) of operation 980. In operation 982, the suggestion module 230 presents the calendar with a representation of a further period of time (e.g., a representation of a third period of time) that is adjacent to the period of time 315 for the event (e.g., the first period of time). For example, the calendar may include representations of one or more dates before or after the period of time 315 for the event. In some example embodiments, the representations of the one or more dates include indicators of additional travel options determined to be compatible with the event. This may have the effect of presenting (e.g., to the user 142 or to the user 152) travel options that extend beyond the period of time 315 of an event. According to certain example embodiments, this may enable the user 142 to make travel plans that accommodate an additional event unrepresented in the calendar data 300. In some example embodiments, this may enable the presentation of one or more additional travel options that are ranked more favorably than the travel option determined in operation 730 (e.g., lower cost, fewer stops, more loyalty points, or other special deal).

According to various example embodiments, one or more of the methodologies described herein may facilitate communication of information about one or more travel options. In particular, one or more of the methodologies described herein may constitute all or part of a business method (e.g., a business method implemented using a machine) that presents one or more users with available travel options determined to be compatible with one or more events. Moreover, presentation of such travel options may be conveniently integrated with calendar information, which may facilitate the making of travel plans.

When these effects are considered in aggregate, one or more of the methodologies described herein may obviate a need for certain efforts or resources that otherwise would be involved in matching users (e.g., as potential consumers of travel options) with travel options that are likely to be of interest to those users. Efforts expended by a user in identifying a travel option may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 10:
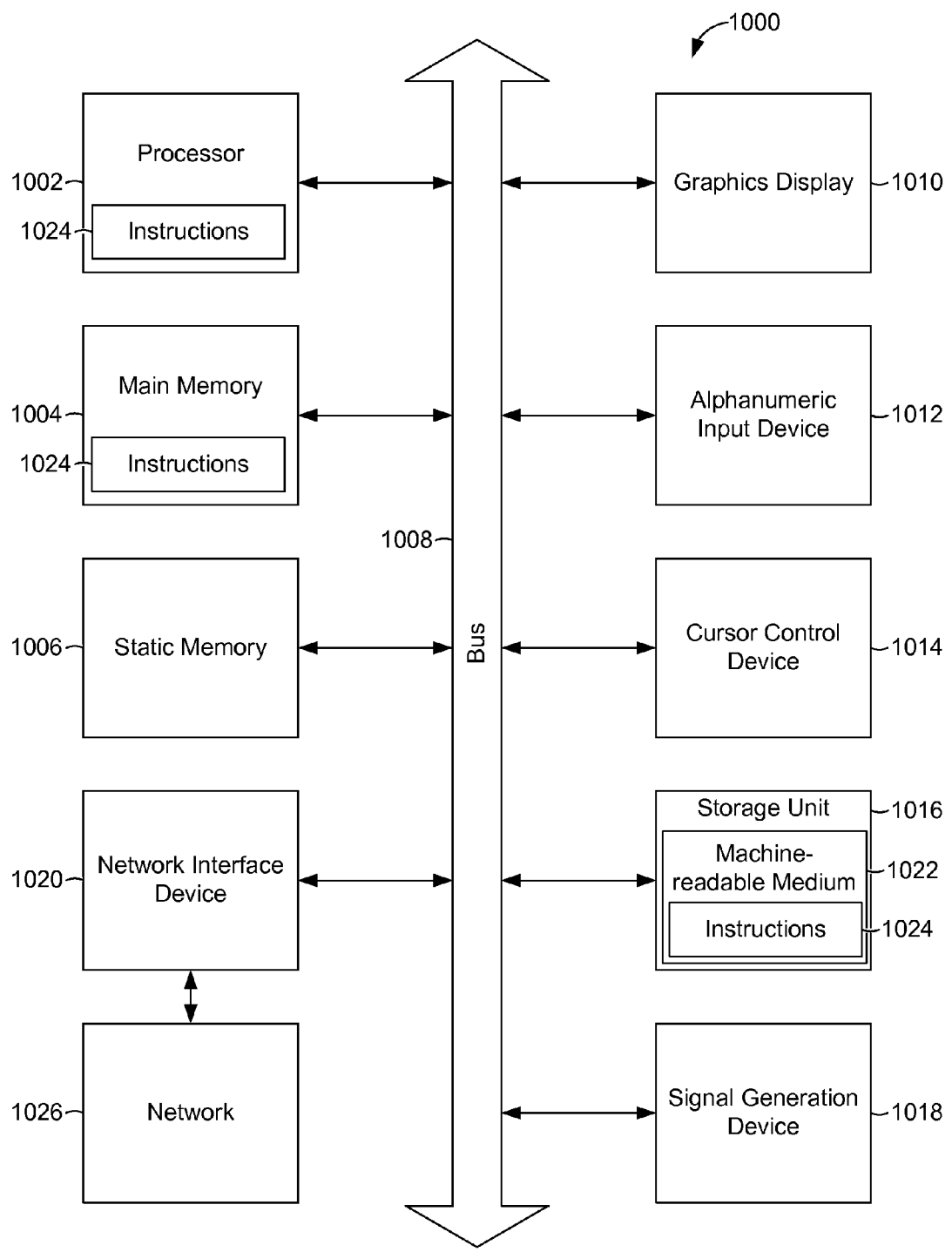
FIG. 10 is a block diagram illustrating components of a machine, according to some example embodiments, able to read instructions from a machine-readable medium and perform any one or more of the methodologies discussed herein.

FIG. 10 illustrates components of a machine 1000, according to some example embodiments, that is able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system and within which instructions 1024 (e.g., software) for causing the machine 1000 to perform any one or more of the methodologies discussed herein may be executed. In alternative embodiments, the machine 1000 operates as a standalone device or may be connected (e.g., networked) to other machines. In a networked deployment, the machine 1000 may operate in the capacity of a server machine or a client machine in a server-client network environment, or as a peer machine in a peer-to-peer (or distributed) network environment. The machine 1000 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1024 (sequentially or otherwise) that specify actions to be taken by that machine. Further, while only a single machine is illustrated, the term "machine" shall also be taken to include a collection of machines that individually or jointly execute the instructions 1024 to perform any one or more of the methodologies discussed herein.

The machine 1000 includes a processor 1002 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1004, and a static memory 1006, which are configured to communicate with each other via a bus 1008. The machine 1000 may further include a graphics display 1010 (e.g., a plasma display panel (PDP), a liquid crystal display (LCD), a projector, or a cathode ray tube (CRT)). The machine 1000 may also include an alphanumeric input device 1012 (e.g., a keyboard), a cursor control device 1014 (e.g., a mouse, a touchpad, a trackball, a joystick, a motion sensor, or other pointing instrument), a storage unit 1016, a signal generation device 1018 (e.g., a speaker), and a network interface device 1020.

The storage unit 1016 includes a machine-readable medium 1022 on which is stored the instructions 1024 (e.g., software) embodying any one or more of the methodologies or functions described herein. The instructions 1024 may also reside, completely or at least partially, within the main memory 1004, within the processor 1002 (e.g., within the processor's cache memory), or both, during execution thereof by the machine 1000. Accordingly, the main memory 1004 and the processor 1002 may be considered as machine-readable media. The instructions 1024 may be transmitted or received over a network 1026 (e.g., network 190) via the network interface device 1020.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., software) for execution by the machine, such that the instructions, when executed by one or more processors of the machine (e.g., processor 1002), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   accessing calendar data of a user,
      the calendar data indicating a first period of time during which the user is scheduled to participate in an event;
   accessing travel data that indicates multiple travel options available for selection by the user,
      the travel data indicating a second period of time during which a travel option among the multiple travel options is scheduled to occur;
   determining that the travel option is compatible with the event in which the user is scheduled to participate,
      the determining being based on a lack of overlap between the first period of time during which the user is scheduled to participate in the event and the second period of time during which the travel option is scheduled to occur, the determining being performed by a processor of a machine; and presenting the travel option determined to be compatible with the event.

2. The method of claim 1, wherein:

the accessing of the travel data includes accessing transportation data that indicates multiple transportation options available for selection by the user;

the travel option is a transportation option among the multiple transportation options; and the determining that the travel option is compatible with the event includes determining that no portion of the first period of time coincides with any portion of the second period of time.

3. The method of claim 2, wherein:

the accessing of the transportation data includes accessing flight information referencing an airline flight; and the travel option includes the airline flight.

4. The method of claim 2, wherein:

the accessing of the transportation data includes accessing schedule information of a transportation service that corresponds to a vehicle selected from a group consisting of a train, a bus, a trolley, a ferry, and a ship; and the travel option includes the schedule information.

5. The method of claim 1, wherein:

the first period of time for the event is separated from the second period of time for the travel option by a third period of time; and the determining that the travel option is compatible with the event includes determining that the third period of time transgresses a threshold period of time.

6. The method of claim 5, wherein:

the calendar data indicates a location of the event; and the method further comprises determining the threshold period of time based on the location of the event.

7. The method of claim 6 further comprising:

accessing additional data selected from a group consisting of weather data, traffic data, passenger screening data, and a preference of the user; and determining the threshold period of time based on the additional data.

8. The method of claim 1, wherein:

the accessing of the travel data includes accessing accommodation data that indicates multiple accommodation options available for selection by the user;

the travel option is an accommodation option among the multiple accommodation options; and the determining that the travel option is compatible with the event includes determining that the first period of time falls within the second period of time.

9. The method of claim 8, wherein:

the accessing of the accommodation data includes accessing hotel information referencing a hotel stay; and the travel option includes the hotel stay.

10. The method of claim 8, wherein:

the calendar data indicates multiple locations corresponding to multiple events that include the event;

the accommodation data indicates a location of the accommodation option; and the determining that the travel option is compatible with the event includes determining that a centroid of the multiple locations is within a threshold distance of the location of the accommodation option.

11. The method of claim 8, wherein:

the calendar data indicates a location of the event, the event being an initial event in a sequence of multiple events at multiple locations that include the location;

the accommodation data indicates a further location of the accommodation option; and the determining that the travel option is compatible with the event includes determining that the location of the initial event is within a threshold distance of the further location.

12. The method of claim 8, wherein:

the calendar data indicates a location of the event, the event being a final event in a sequence of multiple events at multiple locations that include the location;

the accommodation data indicates a further location of the accommodation option; and the determining that the travel option is compatible with the event includes determining that the location of the final event is within a threshold distance of the further location.

13. The method of claim 1, wherein:

the presenting of the travel option includes presenting a suggestion that the user perform a search among the multiple travel options.

14. The method of claim 1, wherein:

the presenting of the travel option includes presenting a suggestion that the user select the travel option determined to be compatible with the event.

15. The method of claim 1, wherein:

the presenting of the travel option includes presenting a reminder that the event is scheduled for the first period of time.

16. The method of claim 15, wherein:

the presenting of the reminder includes communicating the reminder to a device of the user.

17. The method of claim 15, wherein:

the calendar data indicates an attendee of the event other than the user; and the presenting of the reminder includes communicating the reminder to a device of the attendee.

18. The method of claim 1, wherein:

the presenting of the travel option includes presenting a representation of the first period of time and a representation of the second period of time within a calendar.

19. The method of claim 18, wherein:

the presenting of the travel option includes presenting a representation of a third period of time within the calendar as being adjacent to the first period of time.

20. The method of claim 1, wherein:

the calendar data indicates a location of the event; and the determining that the travel option is compatible with the event is based on the location of the event.

21. The method of claim 20 further comprising:

determining a rank of the travel option based on the location of the event; and wherein the presenting of the travel option is based on the determined rank of the travel option.

22. The method of claim 1 further comprising:

determining that the travel option is less expensive than a further travel option among the multiple travel options, the further travel option being determined to be compatible with the event; and wherein the presenting of the travel option is based on the determining that the travel option is less expensive than the further travel option.

23. The method of claim 1 further comprising:
determining that the travel option has a fewer number of stops than a further travel option among the multiple travel options,
the further travel option being determined to be compatible with the event; and wherein
the presenting of the travel option is based on the determining that the travel option has a fewer number of stops than the further travel option.

24. A non-transitory machine-readable storage medium comprising instructions that, when executed by one or more processors of a machine, cause the machine to perform operations comprising:
accessing calendar data of a user,
the calendar data indicating a first period of time during which the user is scheduled to participate in an event;
accessing travel data that indicates multiple travel options available for selection by the user,
the travel data indicating a second period of time during which a travel option among the multiple travel options is scheduled to occur;
determining that the travel option is compatible with the event in which the user is scheduled to participate,
the determining being based on a lack of overlap between the first period of time during which the user is scheduled to participate in the event and the second period of time during which the travel option is scheduled to occur; and
presenting the travel option determined to be compatible with the event.

25. The non-transitory machine-readable storage medium of claim 24, wherein:
the calendar data indicates a location of the event; and
the determining that the travel option is compatible with the event is based on the location of the event.

26. A system comprising:
an access module configured to
access calendar data of a user, the calendar data indicating a first period of time during which the user is scheduled to participate in an event; and to
access travel data that indicates multiple travel options available for selection by the user, the travel data indicating a second period of time during which a travel option among the multiple travel options is scheduled to occur;
a processor configured by an analysis module that configures the processor to determine that the travel option is compatible with the event in which the user is scheduled to participate, the determining being based on a lack of overlap between the first period of time during which the user is scheduled to participate in the event and the second period of time during which the travel option is scheduled to occur; and
a suggestion module configured to present the travel option determined to be compatible with the event.

27. The system of claim 26, wherein:
the calendar data indicates a location of the event; and
the analysis module configures the processor to determine that the travel option is compatible with the event based on the location of the event.

* * * * *

UNITED STATES PATENT AND TRADEMARK OFFICE
CERTIFICATE OF CORRECTION

PATENT NO. : 8,606,801 B2
APPLICATION NO. : 13/210562
DATED : December 10, 2013
INVENTOR(S) : Goldstein et al.

It is certified that error appears in the above-identified patent and that said Letters Patent is hereby corrected as shown below:

On the title page, in column 2, item [56] under "Other Publications", line 4, delete "B," and insert --B.,--, therefor On title page 2, in column 1, item [56] under "Other Publications", line 4, delete "M," and insert --M.,--, therefor On title page 2, in column 1, item [56] under "Other Publications", line 8, delete "J," and insert --J.,--, therefor On title page 2, in column 2, item [56] under "Other Publications", line 2, delete "Machine, p. 58"," and insert --Machine", p. 58,--, therefor In the Specification Column 2, line 29, delete "traveler" and insert --traveller--, therefor Column 7, line 13, delete "250" and insert --315--, therefor Column 8, line 64, delete "FIG." and insert --FIGS.--, therefor In the Claims Column 19, line 33, in claim 6, after "and", insert --¶--, therefor Signed and Sealed this
Twenty-seventh Day of May, 2014

Michelle K. Lee
*Deputy Director of the United States Patent and Trademark Office*